US012626388B2

(12) United States Patent
Huang et al.

(10) Patent No.:    US 12,626,388 B2
(45) Date of Patent:        May 12, 2026

(54) METHOD FOR LOCATION OBJECTS IN ALTERNATIVE REALITY, ELECTRONIC DEVICE, AND NON-TRANSITORY STORAGE MEDIUM

(71) Applicants: HONGFUJIN PRECISION ELECTRONS (YANTAI) CO., LTD., Yantai (CN); HON HAI PRECISION INDUSTRY CO., LTD., New Taipei (TW)

(72) Inventors: Chun-Hsiang Huang, New Taipei (TW); Po-Hsun Huang, New Taipei (TW)

(73) Assignees: HONGFUJIN PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 545 days.

(21) Appl. No.: 18/071,403

(22) Filed: Nov. 29, 2022

(65) Prior Publication Data

US 2024/0013425 A1      Jan. 11, 2024

(30) Foreign Application Priority Data

Jul. 11, 2022    (CN) .......................... 202210813654.0

(51) Int. Cl.
| | |
|---|---|
| *G06T 7/70* | (2017.01) |
| *G06V 10/145* | (2022.01) |
| *G06V 10/25* | (2022.01) |
| *G06V 10/74* | (2022.01) |

(52) U.S. Cl.
CPC .............. *G06T 7/70* (2017.01); *G06V 10/145* (2022.01); *G06V 10/25* (2022.01); *G06V 10/761* (2022.01); *G06V 2201/07* (2022.01)

(58) Field of Classification Search
CPC ........ G06T 7/70; G06V 10/145; G06V 10/25; G06V 10/761; G06V 2201/07; G01S 5/16
See application file for complete search history.

(56) References Cited

PUBLICATIONS

"Burcin Becerik-Gerber et. al., Assessment of target types and layouts in 3D laser scanning for registration accuracy, Aug. 2011, Automation in Construction, vol. 20, Issue 5, pp. 649-658" (Year: 2011).*

(Continued)

*Primary Examiner* — Chineyere Wills-Burns
*Assistant Examiner* — Phuong Hau Cai
(74) *Attorney, Agent, or Firm* — ScienBiziP, P.C.

(57)        ABSTRACT

An object location method to obtain location information of an object based on positioning light comprises: emitting a first positioning light, to scan a preset region where the object is located to obtain a characteristic value of each of multiple standard regions in the preset region, wherein the preset region comprises multiple standard regions; determining a basic region where the object is located according to the characteristic value of each standard region, wherein each of the standard region comprises multiple basic regions; and emitting a second positioning light to the basic regions where the object is located and to obtain coordinates of the object. An electronic device and a non-transitory storage medium are also provided.

13 Claims, 7 Drawing Sheets

<u>100a</u>

(56) References Cited

PUBLICATIONS

"Ryusuke Sagawa et. al., One-Shot 3D Reconstruction of Moving Objects by Projecting Wave Grid Pattern with Diffractive Optical Element, 2014, 11th Laser Metrology for Precision Measurement and Inspection in Industry 2014, Japan" (Year: 2014).*

"C. Thirstrup et. al., Diffractive Optical Coupling Element for Surface Plasmon Resonance Sensors, 2004, Sensors and Actuators B. 100, 298-308" (Year: 2004).*

"Vishal Gandhi et. al., Diffractive Optical Elements for Optical Identification, 2015, Applied Optics, vol. 54, Issue 7, pp. 1606-1611" (Year: 2015).*

"Yu-Kai Chen et. al., Random Bin Picking with Multi-View Image Acquisition and CAD-Based Pose Estimation, Oct. 2018, 2018 IEEE International Conference on Systems, Man, and Cybernetics, Japan") (Year: 2018).*

"Pawel A. Penczek et. al., Identifying Conformational States of Macromolecules by Eigen-Analysis of Resampled Cryo-EM Images, Nov. 2011, Structure 19, 1582-1590" (Year: 2011).*

* cited by examiner

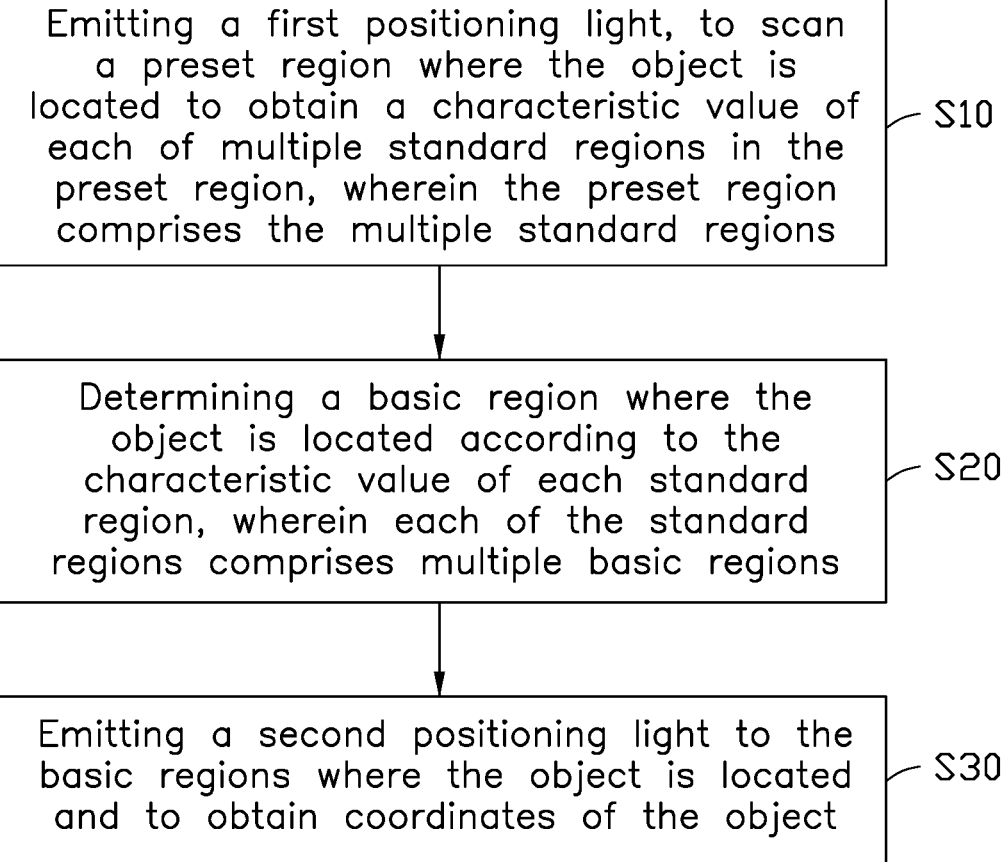

Emitting a first positioning light, to scan a preset region where the object is located to obtain a characteristic value of each of multiple standard regions in the preset region, wherein the preset region comprises the multiple standard regions — S10

Determining a basic region where the object is located according to the characteristic value of each standard region, wherein each of the standard regions comprises multiple basic regions — S20

Emitting a second positioning light to the basic regions where the object is located and to obtain coordinates of the object — S30

FIG. 1

| | | |
|---|---|---|
| I | II | III |
| IV | V | VI |
| VII | VIII | IX |

FIG. 3

|   | I | II | III | IV | V | VI | VII | VIII | IX |
|---|---|----|-----|----|---|----|-----|------|----|
| A | √ | √ |   | √ | √ |   | √ | √ |   |
| B |   | √ | √ |   | √ | √ |   | √ | √ |
| C | √ | √ | √ | √ | √ | √ |   |   |   |
| D |   |   |   | √ | √ | √ | √ | √ | √ |

FIG. 4

METHOD FOR LOCATION OBJECTS IN ALTERNATIVE REALITY, ELECTRONIC DEVICE, AND NON-TRANSITORY STORAGE MEDIUM

TECHNICAL FIELD

The subject matter herein generally relates to object location.

BACKGROUND

Application scenarios developed from virtual reality, augmented reality, and mixed reality technology, are more and more extensive. In the application of virtual reality technology, object detection and locating technology is necessary for achieving input of instructions. However, the existing technology for object detection and locating retrieves, locates and returns information within the whole range of objects, which imposes a high computational load.

In the existing technology, delays in input are frequent and affect the user experience.

BRIEF DESCRIPTION OF THE DRAWINGS

Implementations of the present disclosure will now be described, by way of embodiments, with reference to the attached figures.

FIG. 1 is a flowchart of an embodiment of a method for locating objects in an alternative reality according to the preset disclosure.

FIG. 3 is a diagram showing divisions of a preset region in the method as shown in FIG. 1.

FIG. 4 is a diagram of assigned divisions of the preset region in the method as shown in FIG. 1.

DETAILED DESCRIPTION

Figure 2:
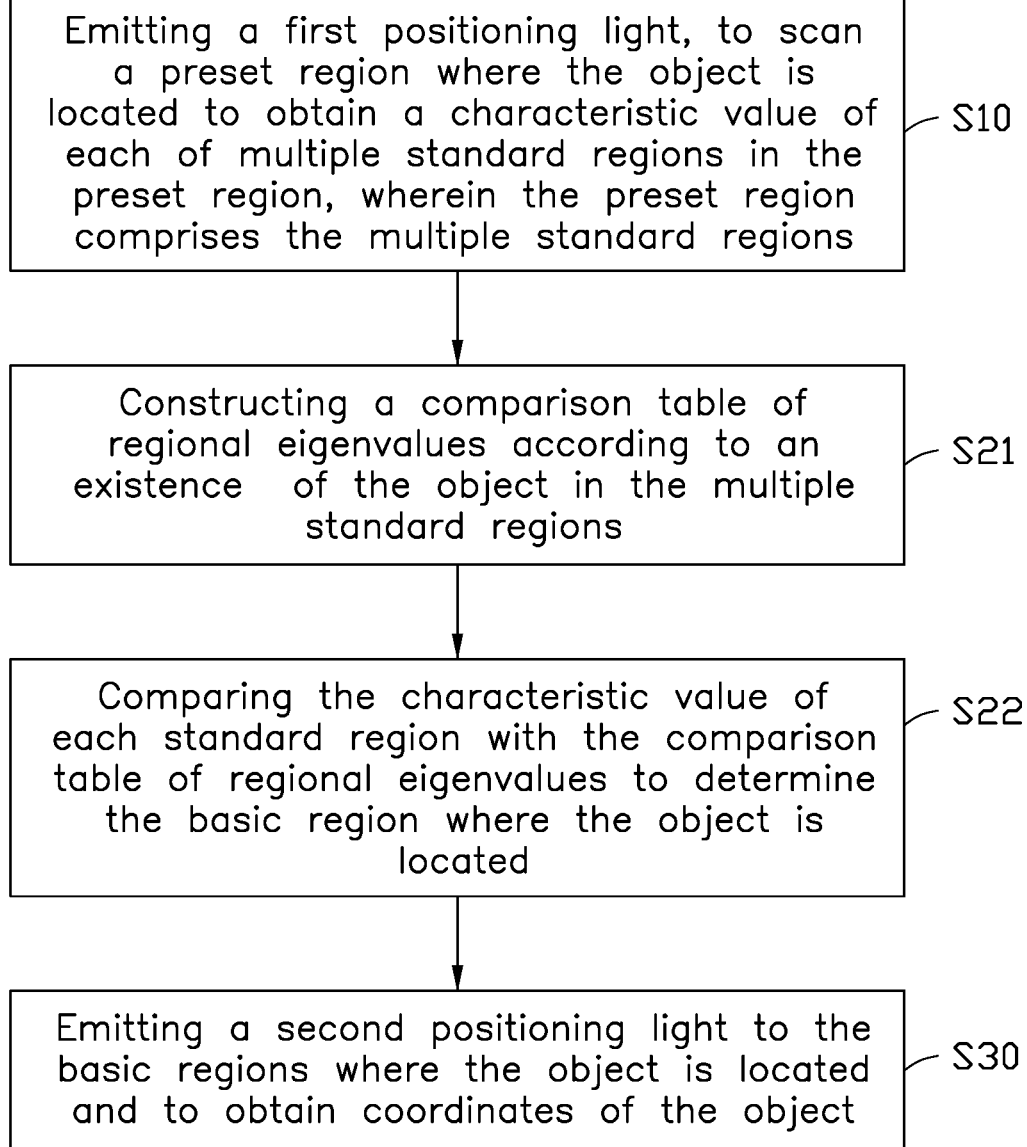
FIG. 2 is a flowchart of another embodiment of a method according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

The method for locating objects in an alternative reality scenario is applied in one or more electronic devices. The electronic device is a device that can automatically carry out numerical calculation and/or information processing according to preset or stored instructions. The hardware is not limited to include Microprogrammed Control Unit, Application Specific Integrated Circuit, Field-Programmable Gate Array, Digital Signal Processor, and embedded devices, etc.

FIG. 1 illustrates one exemplary embodiment of the method. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block S10.

In block S10, a first positioning light is emitted to scan a preset region where the object is located to obtain characteristic values of each of multiple standard regions in the preset region, the preset region comprises the multiple standard regions.

In one embodiment, the scene is determined according to the basic range of objects, associated with VR, AR, XR and so on. An object can be installed in a handle, glove, or other device held by the user, therefore the mothed can be applied in the continuous tracking and positioning of the handle and other devices in the VR, AR, XR and other scenarios, and determine the user's input instructions through his gestures and track of movements.

The laser positioning device in the above system emits a first positioning light to preliminarily locate the object. The large range of the object is defined as a preset region, and the preset region is divided into several standard regions. The first positioning light scans the preset region with low accuracy to detect the presence of an object in the region and obtain eigenvalue results. The scanning of the first positioning light only determines the existence of the object, so the first positioning light does not determine the exact location of the object, this reduces the computing load and improves the positioning speed.

In block S20, a basic region where the object is located is determined according to the characteristic value of each standard region, each of the standard regions comprises multiple basic regions.

A basic region consists of the minimum region of the preset region and the standard region. The characteristic value is determined by whether an object is existing in the region, if the region does have an object, the characteristic value is the object value. If the region does not have an object, the characteristic value does not exist.

In block S30, a second positioning light is emitted to the basic regions where the object is located to obtain the coordinates of the object.

After the basic region in which the object is located is determined by the characteristic value, the basic region is scanned by emitting the second positioning light to more accurately locate the target, so the coordinates of the object can be obtained. The second positioning light is different from the first positioning light, it can obtain the detailed coordinates of the object within a limited range to analyze a trajectory of the object.

In one embodiment, each standard region comprises overlapping region. An overlapping region between the standard regions is comprised within the basic region. Therefore, after the first positioning light has been used to obtain the characteristic value of each standard region, the basic region of the object can be obtained quickly by comparison. If there is no overlap between the standard regions, the most accurate region that can be found by the first positioning light is only the outright size of the standard region, the basic region is not less in area than the standard region. If there is overlap between standard regions, the basic region is not greater than the standard region. Therefore, the division of standard regions including overlapping regions improves the selection efficiency of the first positioning light, speeds up localization efficiency and reduce the computational power required.

In one embodiment, the preset region comprises n*n basic regions, and the standard region comprises n*m of the basic regions, n and m are positive integers, and n≥m.

In this embodiment, n=3, m=2. The preset region comprises 9 basic regions with 3*3 distribution, as shown in FIG. 3, the standard region comprises 6 basic regions with a 3*2 distribution, and the overlapping parts of adjacent standard regions are the 4 basic regions. The table of comparisons of regional eigenvalues are designed by the feature, as shown in FIG. 4.

In one embodiment, the second positioning light comprises one or more spots of light arranged in an array. In this embodiment, the second positioning light is a group of multiple 3*3 array spots generated by diffraction, and each spot irradiates a basic region. After the basic region where the object is located is determined by the first positioning light, the light spots of the second positioning light are aimed at the basic region along the established direction to determine the specific coordinates of an object, according to which spot illuminates the object. In another embodiment, the arrangement of spots of the second positioning light and the scanning parameters can be determined according to the accuracy requirements, the sizes and numbers of the objects and the basic region.

In one embodiment, As shown in FIG. 2, the basic region of the object being determined by the characteristic value of each standard region comprises:

In block S21, a comparison table of regional eigenvalues is constructed according to an existence of objects in the multiple standard regions.

In block S22, the basic region where the object is located is determined by comparing the characteristic value of the standard region with the comparison table of regional eigenvalues.

In block S21, in the region eigenvalue comparison table, the eigenvalues of each standard region corresponding to the case where an object is located in each basic region are listed separately. In block S22, the eigenvalue data obtained from block S10 is compared with the comparison table of regional eigenvalues to determine the basic region where an object is located.

In one embodiment, objects in a different basic region match the unique characteristic value of the standard region in the comparison table of regional eigenvalues.

Referring to FIG. 4, a comparison table of regional eigenvalues in this embodiment is disclosed. Wherein A, B, C, D refer to four standard regions, standard region A includes I, II, IV, V, VII, VIII, six basic regions, standard region B includes II, III, V, VI, VIII, IX, six basic regions, standard region C includes I, II, III, IV, V, VI, six basic regions, standard region D includes IV, V, VI, VII, VIII and IX, also six basic regions. When the object is in the basic region, the abscissa represents the eigenvalues obtained by each standard region. If the eigenvalue is found, it means the presence of the object eigenvalue is detected. For example, the eigenvalue can be detected in standard regions B and C, but not in standard regions A and D. The eigenvalue is compared with the comparison table in FIG. 4, and it can be determined that the current object is in the region of the III basic region. In this way, overall scanning (that is, scanning the whole preset region) is avoided, the range of accurate scanning and positioning is narrowed, saving computing resources, and improving the detection speed.

Figure 5:
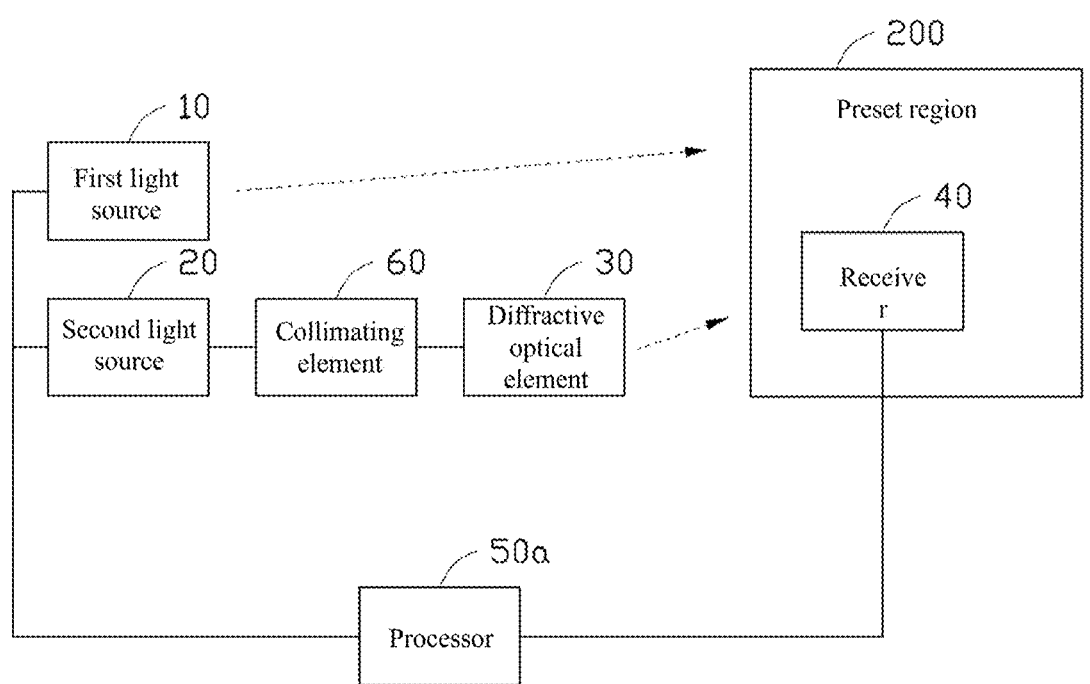
FIG. 5 is a diagram showing modules of an electronic device.

Referring to FIG. 5, an electronic device 100a comprises a first light source 10, a second light source 20, a diffractive optical element 30, a receiver 40, and a processor 50a. The second light source 20 is connected to the diffractive optical element, and the first light source 10, the second light source 20, and the receiver 40 are coupled to the processor 50a. The processor 50a controls the first light source 10 to emit a first positioning light, and the first positioning light scans a preset region where the receiver 40 is located to obtain the characteristic values of each standard region in the preset region. The preset region comprises multiple standard regions, the processor 50a is configured to determine a basic region where the receiver 40 is located according to each characteristic value of each of the multiple standard regions. Each of the multiple standard regions comprises multiple basic regions, the processor 50a then controls the second light source 20 to emit a second positioning light onto the basic region where the receiver 40 is located, to obtain coordinates of the receiver 40.

The electronic device 100a can be configured for VR, AR, and XR scenarios. For example, the object is set in the handle and other wearable devices, and used in the preset range, the first light source 10 and the second light source 20 scan within the preset range to locate the specific coordinates of the object to determine the track of movement of a wearable device carried by the user and the instruction input by the user.

In one embodiment, the electronic device 100a further comprises a collimating element 60 arranged between the second light source 20 and the diffractive optical element 30 to collimate the light emitted by the second source 20.

In one embodiment, the diffractive optical element 30 comprises a diffraction grating. The diffraction grating scatters the second positioning light into n*n arranged spots, n and m are positive integers, and n is bigger than m to meet the demand of the first positioning light.

Figure 6:
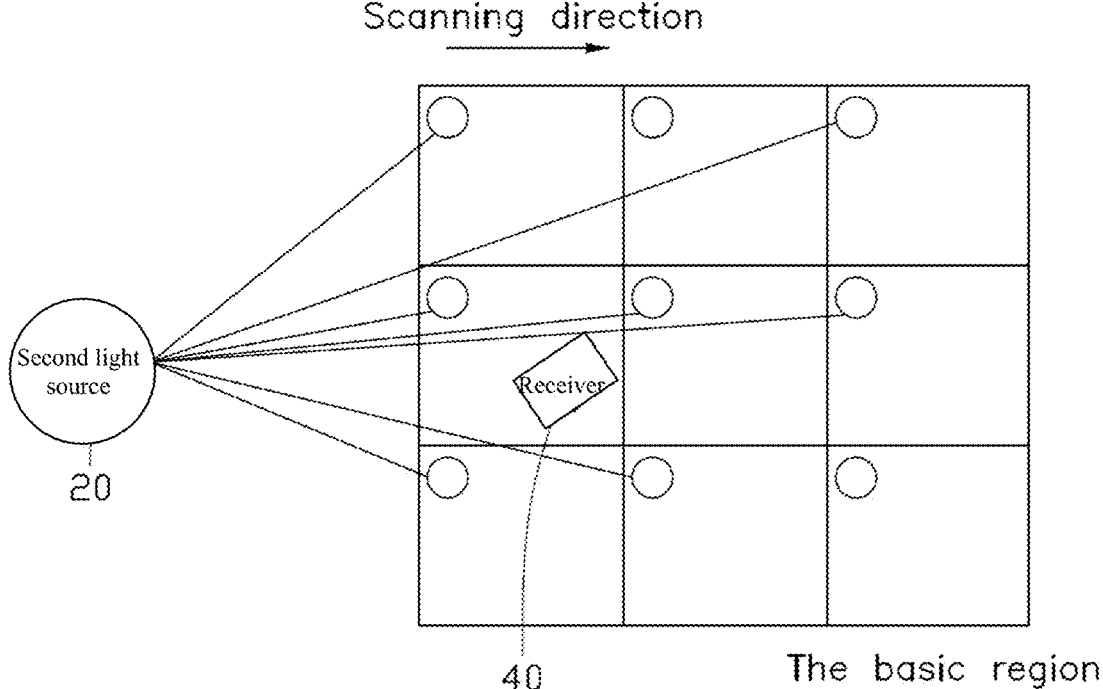
FIG. 6 is the schematic diagram of a scanning receiver for a second light source of the electronic device of FIG. 5.

Referring to FIG. 6, in one embodiment, the second light source 20 emits the second positioning light through the diffractive optical element 30. The second positioning light is a 3*3 arrangement of spots, and each spot corresponds to a basic region. After the basic region of the receiver 40 is determined by the first positioning light, the 3*3 spots of the second positioning light scan the basic region along the established direction, and specific coordinates of the receiver 40 in the basic region are thereby determined according to which spot and the point in time when a spot is scanned to the receiver 40. In other embodiments, the arrangement of spots of the second positioning light can be determined and selected, scanning parameters can be determined and selected depending on the accuracy requirements, the size and number of the receivers 40, and the basic region.

Figure 7:
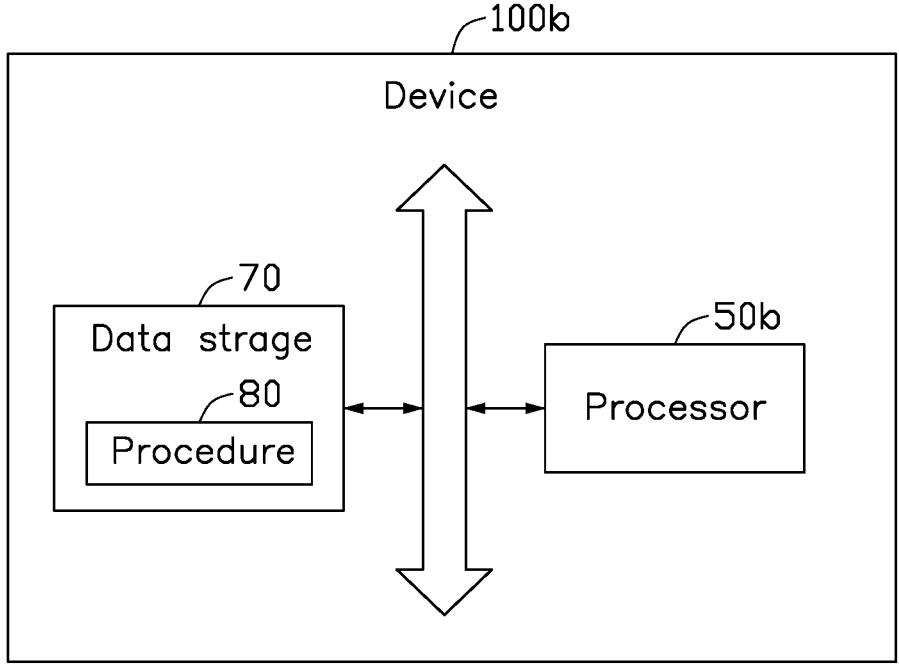
FIG. 7 is an architecture diagram of another electronic device.

In one embodiment, as shown in FIG. 7, the electronic device 100*b* further comprises a data storage 70. The data storage 70 stores a procedure 80 for object location, The procedure 80 may comprise a plurality of computer codes, the computer codes may include commands that can be executed by the processor 50*b*. For example, the processor 50*b* can execute the computer codes to apply the method described in FIG. 1 or FIG. 2.

In one embodiment, the data storage 70 can be in the electronic device 100*b*, or can be a separate external memory card, such as an SM card (Smart Media Card), an SD card (Secure Digital Card), or the like. The data storage 70 can include various types of non-transitory computer-readable storage mediums. For example, the data storage 70 can be an internal storage system, such as a flash memory, a random access memory (RAM) for temporary storage of information, and/or a read-only memory (ROM) for permanent storage of information. The data storage 70 can also be an external storage system, such as a hard disk, a storage card, or a data storage medium. The processor 50*b* can be a central processing unit (CPU), a microprocessor, or other data processor chip that performs functions of the electronic device 100*b*.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An object location method applied to an electronic device, the electronic device comprising a first light source, a second light source, a diffractive optical element, a receiver, and a processor, the second light source being connected with the diffractive optical element; the first light source, the second light source, and the receiver being coupled to the processor, the object location method comprising:

controlling, by the processor, the first light source to emit a first positioning light, to scan a preset region where the receiver is located to obtain a characteristic value of each of multiple standard regions in the preset region, wherein the preset region comprises the multiple standard regions, the processor obtains the characteristic value of each of multiple standard regions in the preset region according to the first positioning light received by the receiver;

constructing, by the processor, a comparison table of regional eigenvalues according to whether the receiver has existed in the multiple standard regions;

comparing, by the processor, the characteristic value of each of the multiple standard regions with the comparison table of regional eigenvalues to determine a basic region where the receiver is located, wherein each of the multiple standard regions comprises multiple basic regions; and controlling, by the processor, the second light source to emit a second positioning light to the basic regions where the receiver is located to obtain coordinates of the receiver, wherein the processor obtains the coordinates of the receiver according to the second positioning light received by the receiver.

2. The object location method of claim 1, wherein the receiver in different basic regions of the same standard region shares a unique characteristic value of the same standard region in the comparison table of regional eigenvalues.

3. The object location method of claim 1, wherein each of the multiple standard regions comprises at least one unique basic region which is different from a remaining of the basic regions.

4. The object location method of claim 3, wherein the preset region comprises n*n of the basic regions, and the standard region comprises n*m of the basic regions, n and m are positive integers, and n≥m.

5. The object location method of claim 1, wherein the second positioning light comprises light spots arranged in an array, and an area swept by the light spots cover the preset region.

6. An electronic device, comprising:

a first light source, a second light source, a diffractive optical element, a receiver, and a processor;

wherein the second light source is connected with the diffractive optical element; the first light source, the second light source, and the receiver are coupled to the processor; the processor controls the first light source to emit a first positioning light to scan a preset region where the receiver is located, the processor obtains characteristic values of each of multiple standard regions in the preset region according to the first positioning light received by the receiver; and wherein the preset region comprises the multiple standard regions, the processor constructs a comparison table of regional eigenvalues according to whether the receiver has existed in the multiple standard regions; and the processor further compares the characteristic value of each of the multiple standard regions with the comparison table of regional eigenvalues to determine a basic region where the receiver is located, each of the multiple standard regions comprises multiple basic regions, the processor controls the second light source to emit a second positioning light to the basic regions where the receiver is located, the processor obtains coordinates of the receiver according to the second positioning light received by the receiver.

7. The electronic device of claim 6, further comprising a collimating element arranged between the second light source and the diffractive optical element.

8. The electronic device of claim 6, wherein the diffractive optical element comprises a diffraction grating, the diffraction grating scatters the second positioning light into light spots arranged in an array, and an area swept by the light spots cover the preset region.

9. A non-transitory storage medium having stored thereon instructions that, when executed by a processor of an electronic device, causes the electronic device to perform an object location method, the electronic device comprising a first light source, a second light source, a diffractive optical element, a receiver, and a processor, the second light source being connected with the diffractive optical element; the first light source, the second light source, and the receiver being coupled to the processor, the object location method comprising:

controlling, by the processor, the first light source to emit a first positioning light, to scan a preset region where the receiver is located to obtain a characteristic value of each of multiple standard regions in the preset region, wherein the preset region comprises the multiple standard regions, the processor obtains the characteristic value of each of multiple standard regions in the preset region according to the first positioning light received by the receiver;

constructing, by the processor, a comparison table of regional eigenvalues according to whether the receiver has existed in the multiple standard regions;

comparing, by the processor, the characteristic value of each of the multiple standard regions with the comparison table of regional eigenvalues to determine a basic region where the receiver is located, wherein each of the multiple standard regions comprises multiple basic regions; and controlling, by the processor, the second light source to emit a second positioning light to the basic regions where the receiver is located to obtain coordinates of the receiver, wherein the processor obtains the coordinates of the receiver according to the second positioning light received by the receiver.

10. The non-transitory storage medium of claim 9, wherein the receiver in different basic regions of the same standard region shares a unique characteristic value of the same standard region in the comparison table of regional eigenvalues.

11. The non-transitory storage medium of claim 9, wherein each of the multiple standard regions comprises at least one unique basic region which is different from a remaining of the basic regions.

12. The non-transitory storage medium of claim 11, wherein the preset region comprises n*n of the basic regions, and the standard region comprises n*m of the basic regions, n and m are positive integers, and n≥m.

13. The non-transitory storage medium of claim 9, wherein the second positioning light comprises light spots arranged in an array, and an area swept by the light spots cover the preset region.

* * * * *